(12) United States Patent
Goody

(10) Patent No.: US 9,229,456 B2
(45) Date of Patent: Jan. 5, 2016

(54) METHOD OF AND SYSTEM FOR CALIBRATING GAS FLOW DILUTORS

(75) Inventor: Brian Arthur Goody, Surrey (GB)

(73) Assignee: LNI SCHMIDLIN SA (LNI SCHMIDLIN AG) (LNI SCHMIDLIN LTD), Chatelaine (CH)

( * ) Notice: Subject to any disclaimer, the term of this patent is extended or adjusted under 35 U.S.C. 154(b) by 560 days.

(21) Appl. No.: 13/641,980

(22) PCT Filed: Apr. 18, 2011

(86) PCT No.: PCT/IB2011/000844
§ 371 (c)(1),
(2), (4) Date: Oct. 18, 2012

(87) PCT Pub. No.: WO2011/132049
PCT Pub. Date: Oct. 27, 2011

(65) Prior Publication Data
US 2013/0041611 A1    Feb. 14, 2013

(30) Foreign Application Priority Data
Apr. 19, 2010  (GB) .................................. 1006530.8

(51) Int. Cl.
*G01F 25/00*    (2006.01)
*G05D 11/03*    (2006.01)

(52) U.S. Cl.
CPC ....................................... *G05D 11/03* (2013.01)

(58) Field of Classification Search
USPC .......................................................... 702/100
See application file for complete search history.

(56) References Cited

U.S. PATENT DOCUMENTS

| | | | |
|---|---|---|---|
| 3,886,971 A | | 6/1975 | Lundsgaard et al. |
| 5,261,452 A | * | 11/1993 | McAndrew et al. .......... 137/606 |
| 5,305,630 A | * | 4/1994 | Molozay et al. ............... 73/1.05 |
| 5,329,965 A | | 7/1994 | Gordon |
| 5,524,473 A | * | 6/1996 | Haskell .......................... 73/1.03 |
| 5,614,655 A | | 3/1997 | Horn |

(Continued)

FOREIGN PATENT DOCUMENTS

| | | | |
|---|---|---|---|
| CN | 1159019 A | 9/1997 | |
| GB | 2 255 178 | * 10/1992 | ............. G01N 21/61 |

(Continued)

OTHER PUBLICATIONS

Japanese Office Action dated Jun. 16, 2014, from corresponding JP application.

(Continued)

*Primary Examiner* — Tung S Lau
(74) *Attorney, Agent, or Firm* — Young & Thompson

(57) ABSTRACT

The preferred embodiments described herein make possible to use lower cost, fixed flow components, such as critical orifices, which are fast to stabilize to a steady flow. These cannot be adjusted to achieve equal flows but are selected to be sensibly close to their desired flow values. This embodiment determines the true ratios of the flows of all of the flow controlling components. Actual flows are not measured but near equal flows are each fed to a common flow meter and the ratio of the indicated flow meter readings is taken to be the same as the ratio of the flows. Two, near equal flows are then combined and compared to a single flow of approximately the same value, and so on. The flow meter is used only to compare near equal flows so does not need to be calibrated nor linear over a wide range.

12 Claims, 2 Drawing Sheets

(56) References Cited

U.S. PATENT DOCUMENTS

| | | | |
|---|---|---|---|
| 5,661,225 A | * | 8/1997 | Ridgeway et al. ............. 73/1.06 |
| 2008/0190168 A1 | | 8/2008 | Booker et al. |

FOREIGN PATENT DOCUMENTS

| | | | | |
|---|---|---|---|---|
| GB | 2333614 | | 7/1999 | |
| GB | 2 446 409 | * | 8/2008 | ................ F17C 1/00 |
| JP | 5118972 A | | 5/1993 | |
| JP | 778032 A | | 3/1995 | |
| JP | 2008507698 A | | 3/2008 | |
| WO | WO 2004/020081 | * | 4/2004 | ............. B01F 15/04 |

OTHER PUBLICATIONS

International Search Report dated Aug. 23, 2011, corresponding to PCT/IB2011/000844.

B.A. Goody et al.; "High-Accuracy Gas Flow Dilutor Using Mass Flow-Controllers with Binary Weighted Flows; HighAccuracy Gas Dilutor"; vol. 13, No. 7, Jul. 1, 2002.

Translation of Chinese Search Report from corresponding CN application.

* cited by examiner

Fig. 2

--- delivering diluent gas through a pressure regulator (5) to a calibrating fluid flow component (8A) only, and with a flow meter (11), reading an indication of a first diluent gas flow FD8A

--- delivering diluent gas through the pressure regulator (5) to fixed fluid flow component combinations, reading an indication of the flow meter (11) for each respective flow, and then making first - fifth approximations:

$FD8B = FD8A \cdot ID8B/ID8A,  \quad FD(8C) = FD(8A+8B) \cdot ID8C/ID(8A+8B),$ $FD(8D) = FD(8A+8B+8C) \cdot ID(8D) / ID(8A+8B+8C)$ $FD(8E) = FD(8A+8B+8C+8D) \cdot ID(8E) / ID(8A+8B+8C+8D)$ $FD(8F) = FD(8A+8B+8C+8D+8E) \cdot ID(8F) / ID(8A+8B+8C+8D+8E)$

--- from the first - fifth approximations, determining relative flows of first - fifth flow fluid components (8B-8F) supplied with diluent gas through the pressure regulator (5) and with respect to the calibrating fixed flow fluid component (8A) also supplied with diluent gas through the pressure regulator (5)

--- feeding fluid flow components (8A-8F) with diluent gas through a pressure regulator (4) to the fixed fluid flow component combinations, reading an indication of the flow meter (11) for each respective flow, and then making sixth - tenth approximations:

$FS(8B) = FS(8A) \cdot IS(8B) / IS(8A), \quad FS(8C) = FS(8A+8B) \cdot IS(8C) / IS(8A+8B)$ $FS(8D) = FS(8A+8B+8C) \cdot IS(8D) / IS(8A+8B+8C)$ $FS(8E) = FS(8A+8B+8C+8D) \cdot IS(8E) / IS(8A+8B+8C+8D)$ $FS(8F) = FS(8A+8B+8C+8D+8E) \cdot IS(8F) / IS(8A+8B+8C+8D+8E)$

--- from the sixth - tenth approximations, determining respective relative flows of the first - fifth fixed flow fluid components (8B-8F) when supplied with diluent gas through the pressure regulator (4) and with respect to the calibrating fixed flow fluid component (8A) also supplied with diluent gas through the pressure regulator (4)

--- comparing the flow through the calibrating fluid flow component (8A) with gas from the pressure regulator (4) to the flow obtained with diluent gas through the pressure regulator (5) to obtain $FS(8A) = FD(8A) \cdot IS(8A) / ID(8A)$.

METHOD OF AND SYSTEM FOR CALIBRATING GAS FLOW DILUTORS

BACKGROUND OF THE INVENTION

1. Field of the Invention

The present invention relates to a method and system for calibrating gas flow dilutors.

Standard gas mixtures are available in gas cylinders containing a fixed concentration of an analyte gas (for instance carbon monoxide) in a matrix gas (for instance nitrogen). Gas flow dilutors combine a flow of standard gas mixture with an additional flow of the relevant matrix gas (referred to as diluent gas) to provide a dilution. Adjustment of the ratio of the two flow rates provides a means of adjusting the concentration of analyte in the combined flow.

The present invention seeks to provide improved calibration of gas dilutors of a type which functions by turning "on" or "off", in various combinations, a number of fixed flows of standard gas mixture and diluent gas. Such gas dilutor types are well known and often use capillaries, orifices or critical orifices as the fixed flow controlling components.

Gas dilutors are generally calibrated by measuring the actual flows of the flow controlling components with respect to external reference standards of flow. Such calibrations of commercially available gas dilutors are often performed annually, in calibration laboratories. This is expensive, time consuming and the accuracy may not be maintained throughout this period.

2. Description of the Related Art

However, calibration of actual flows is unnecessary since dilution is a function of flow ratios and knowledge of actual flow values is not required. British patent GB-B-2,333,614 describes a method of calibrating a number of flow controlling devices to accurately set their flow ratios by adjusting a series of flow combinations to give equal readings on a common flow meter. A detailed description of a "high-accuracy gas flow dilutor using mass flow controllers with binary weighted flows", which utilises this method, was published in Measurement Science and Technology 13 (2002) 1138-1145. The method may be used to perform calibrations practically at frequent intervals at the point of use.

The method of British patent GB-B-2,333,614 is only applicable to dilutors which use flow-controlling components that are adjustable and can be set to a desired flow, such as mass flow controllers. Mass flow controllers are large, expensive and slow to stabilise to an adjustment of their flow. An accurate calibration, which depends upon adjusting flows to be equal, can therefore be protracted.

BRIEF SUMMARY OF THE INVENTION

Document U.S. Pat. No. 3,886,971 discloses a dilutor having fixed fluid flow components.

The present invention seeks to provide an improved method and system for calibrating gas flow dilutors.

According to an aspect of the present invention, there is provided a method of calibrating a gas flow dilutor including the steps of providing a plurality of fixed flow fluid components, these being selected to provide desired flow rates; obtaining a measure of fluid flow through the plurality of fixed flow components by feeding the flow from one or more of said components through a common flow meter and measuring the flows through the flow components and determining therefrom the ratios of the flows, thereby to obtain said measure of flow through the components.

According to another aspect of the present invention, there is provided apparatus for calibrating a gas flow dilutor including plurality of fixed flow fluid components operable to provide desired flow rates; a common flow meter coupled to receive fluid flow from said fluid flow components and operable to obtaining a measure of fluid flow through the plurality of fixed flow components, means for determining therefrom the ratios of the flows, thereby to obtain a measure of flow through the components.

The preferred embodiments described herein make possible to use lower cost, fixed flow components, such as critical orifices, which are fast to stabilise to a steady flow. These cannot be adjusted to achieve equal flows but are selected to be sensibly close to their desired flow values. This embodiment determines the true ratios of the flows of all of the flow controlling components. Actual flows are not measured but near equal flows are each fed to a common flow meter and the ratio of the indicated flow meter readings is taken to be the same as the radio of the flows. Two, near equal flows are then combined and compared to a single flow of approximately the same value, and so on. The flow meter is used only to compare near equal flows so does not need to be calibrated nor linear over a wide range.

BRIEF DESCRIPTION OF THE DRAWINGS

FIG. 2 is schematic illustration an embodiment of flow control method for calibrating a gas flow dilutor.

An embodiment of the present invention is described below, by way of example only, with reference to the drawing in which FIG. 1 shows in schematic form an embodiment of flow control device and in particular for calibrating a gas flow dilutor.

DETAILED DESCRIPTION OF THE PREFERRED EMBODIMENTS

Figure 1:
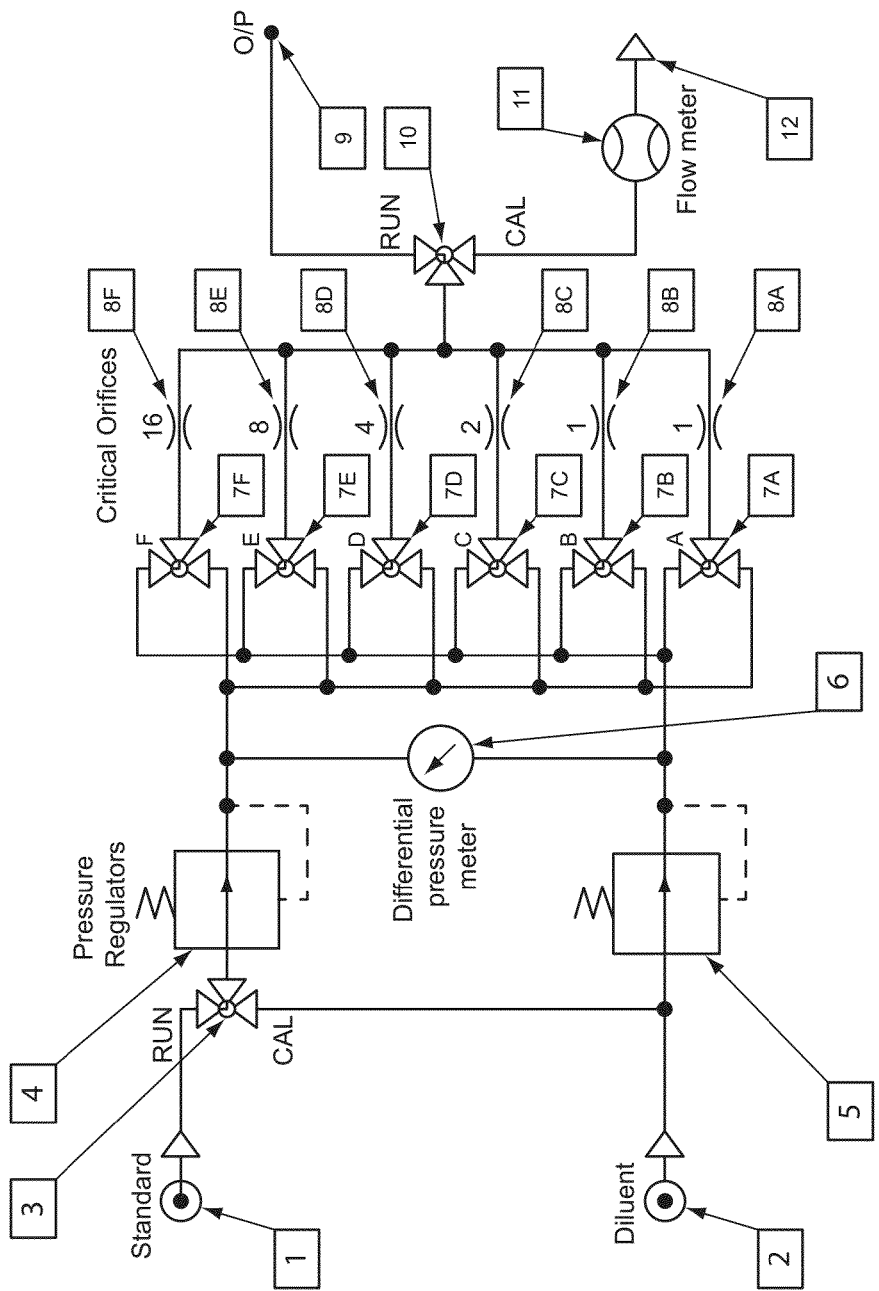
FIG. 1 is schematic illustration an embodiment of flow control device and in particular for calibrating a gas flow dilutor.

Referring to FIG. 1, this shows, by way of example, an embodiment of a gas flow dilutor using critical orifices as the flow controlling components. The generic design is known but additional components, 7A, 8A and 11 are incorporated to make possible an improved method of calibration. It is preferred that component 6 is also included to improve the accuracy of the calibration.

Standard gas is supplied at input 1 to pressure regulator 4 via three-way tap 3 and feeds taps 7A to 7F. Diluent gas is supplied at input 2 to pressure regulator 5 and feeds taps 7A to 7F. These taps allow either standard gas or diluent gas to flow to critical orifices 8A to 8F. Additionally, each tap may be positioned to simultaneously shut off the flow of both gases.

The combined flows from the critical orifices flow to tap 10 and can be directed to the output port 9 or through flow meter 11 to exhaust port 12.

Tap 3 allows diluent gas to be conveniently fed to regulator 4 in place of standard gas in order to conserve standard gas during calibration.

Different dilutions of the standard gas are obtained by changing the combinations of settings of taps 7A to 7F.

Critical orifices 8A to 8F are selected to give nominal (for instance, within ±3% of value) flows of 1, 1, 2, 4, 8 and 16 units of flow respectively. (A unit of flow is chosen to provide the desired flow rate from the output.)

The output pressures from the regulators 4 and 5 are preferably equal and sufficient to ensure correct operation of the critical orifices.

Differential pressure meter 6 allows the output pressures of the two regulators 4 and 5 to be conveniently set to be equal. It also allows changes in the output pressures, which may result from changes in flow, to be monitored and compensated for.

The flow meter 11 does not need to be accurately calibrated, nor highly linear, as it is used only to compare pairs of flows that are close to being equal.

The preferred method of calibration is as follows:

1) diluent gas is connected to port 2 and its pressure adjusted to be sufficient to supply the regulators 4 and 5;
2) tap 3 is set to supply diluent gas to both regulators;
3) taps 7B to 7F are set to off (no flow);
4) tap 7A is set to supply diluent gas to critical orifice 8A;
5) tap 10 is set to direct the flow through the flow meter 11;
6) the flow from the diluent regulator 5 through orifice 8A will be referred to as FD(8A) and is conveniently used as the reference flow to which all other flows are compared. The corresponding indication of flow on meter 11 will be referred to as ID(8A);
7) tap 7A is turned to off and tap 7B set to provide flow from regulator 5 to orifice 8B. The flow FD(8B) gives indication ID(8B);
8) then, to a close approximation:

$$FD(8B)=FD(8A).\ ID(8B)/ID(8A);$$

9) both taps 7A and 7B are set to flow gas from regulator 5. Using a similar nomenclature, the combined flow FD(8A+8B) is indicated on meter 11 as ID(8A+8B);
10) taps 7A and 7B are set to off. Tap 7C is set to flow from regulator 5 to achieve flow FD(8C) and indication ID(8C);
11) then, to a close approximation:

$$FD(8C)=FD(8A+8B).\ ID(8C)/ID(8A+8B);$$

12) by a similar process of combining flows and comparing with a similar flow the following close approximations may be determined:

$$FD(8D)=FD(8A+8B+8C).\ ID(8D)/ID(8A+8B+8C)$$

$$FD(8E)=FD(8A+8B+8C+8D).\ ID(8E)/ID(8A+8B+8C+8D)$$

$$FD(8F)=FD(8A+8B+8C+8D+8E).\ ID(8F)/ID(8A+8B+8C+8D+8E).$$

This provides sufficient information to determine the relative flow of critical orifices 8B to 8F when supplied from regulator 5, and with respect to the flow through orifice 8A, also supplied from regulator 5;

13) steps 4) to 12) are then repeated, but the taps are set to supply gas from pressure regulator 4 rather than regulator 5. These flows and indications will be referred to as FS and IS, respectively and the following close approximations may be determined:

$$FS(8B)=FS(8A).\ IS(8B)/IS(8A)$$

$$FS(8C)=FS(8A+8B).\ IS(8C)/IS(8A+8B)$$

$$FS(8D)=FS(8A+8B+8C).\ IS(8D)/IS(8A+8B+8C)$$

$$FS(8E)=FS(8A+8B+8C+8D).\ IS(8E)/IS(8A+8B+8C+8D)$$

$$FS(8F)=FS(8A+8B+8C+8D+8E).\ IS(8F)/IS(8A+8B+8C+8D+8E)$$

This provides sufficient information to determine the relative flows of critical orifices 8B to 8F when supplied from regulator 4, and with respect to the flow through orifice 8A, also supplied from regulator 4.

14) Using the flow meter 11, the flow through orifice 8A when supplied from regulator 4 is compared to the flow obtained when supplied from regulator 5. Thus:

$$FS(8A)=FD(8A).\ IS(8A)/ID(8A)$$

15) The relative flows of diluent gas or standard gas through each of the orifices can then be calculated.

In operation, taps 7A to 7F are used in combination to set up flows of standard gas and diluent gas. The relative flow of the two gases defines the dilution.

In practice, the output pressure of the two regulators 4 and 5 may reduce with increasing flow through them. This would result in a reduction of flow through the orifices and a consequent error in the determined relative flows and hence, the dilution. This effect may be small enough to be ignored but pressure meter 6 can be used to measure the relationship between pressure and flow and to apply compensation.

There are various modifications possible to the above described embodiment. For instance, flow controlling devices such as capillaries or non-critical orifices could be used. The number of flow controlling devices may be increased or decreased. The nominal flows of the flow controlling devices need not follow a binary weighted relationship (for example 1, 1, 1, 3, 5 and 10 units of flow). The flow meter could be selected from two or more in order to increase the range of measurement. The regulated pressures could be individually monitored. The order of making the calibration measurements could be varied. The processing of the calibration data could be varied. The system could be used to provide linear flow control of a single gas.

The calibration method and apparatus disclosed herein can be incorporated into existing types of gas flow dilutors so that they can be frequently (for instance, daily) recalibrated by the user to remove the effects of long-term drift. This produces a potentially more accurate dilutor (0.1% relative uncertainty has been achieved) and removes the cost and downtime associated with sending the dilutor to a laboratory for regular recalibration.

The invention claimed is:

1. A method for the calibration of a gas flow dilutor comprising a first gas port (1) that provides a supply of gas, and a second gas port (2), the second gas port (2) being a diluent gas port (2) that provides a supply of diluent gas, the first gas port connected to a first gas pressure regulator (4), and second gas port being connected to a second gas pressure regulator (5), the second gas pressure regulator being a diluent gas pressure regulator (5), a first tap (7A) connecting an outlet of the first gas pressure regulator and an outlet of the second gas pressure regulator to a calibrating fixed flow fluid component (8A), and further taps (7B, ... 7F) respectively connecting the outlet of the first gas pressure regulator (4) and the outlet of the second gas pressure regulator (5) to each of a plurality of fixed flow fluid components (8B-8F), a first of said plurality of fixed flow fluid components (8B) having a same flow rate as a flow rate of the calibrating fixed flow fluid component (8A), an outlet of the calibrating fixed flow fluid component (8A) and an outlet of each of the plurality of fixed flow fluid components (8B-8F) being interconnected with each other and forming a common outlet of the gas flow dilutor; said method comprising the steps of:

delivering the diluent gas from the diluent gas port (2) through the diluent gas pressure regulator (5) to the calibrating fixed flow fluid component (8A) so that the diluent gas is delivered only to the calibrating fluid fixed flow fluid component (8A) and not to any of the plurality of fixed flow fluid components (8B-8F) thereby to establish a first diluent gas flow called flow FD8A through the common output of the gas flow dilutor;

with the common output of the gas flow dilutor connected to a flow meter (11), reading a first value of a diluent gas flow indication corresponding to said flow FD8A, the first value being called ID8A and being a reference flow value to which all other diluent gas flows will be compared;

delivering the diluent gas from the diluent gas port (2) through the diluent gas pressure regulator (5) to only the first fixed flow fluid component (8B) of said plurality of fixed flow fluid components to thereby establish a second diluent gas flow called flow FD8B through the common outlet of the gas flow dilutor, and, using the flow meter (11) connected to the common output, reading a second value of a diluent gas flow indication corresponding to the flow FD8B, the second value being called ID8B;

making a first approximation $$FD\mathbf{8}B = FD\mathbf{8}A * (ID\mathbf{8}B/ID\mathbf{8}A);$$

delivering the diluent gas from the diluent gas port (2) through the diluent gas pressure regulator (5) to only the calibrating fluid fixed flow fluid component (8A) and to the first fixed flow fluid component (8B) of said plurality of fixed flow fluid components (8B-8F) to establish a third diluent gas flow called combined flow FD(8A+8B) at the common outlet of the gas flow dilutor, and, using the flow meter (11) connected to the common output, reading a third value of a diluent gas flow indication corresponding to said combined flow FD(8A+8B), the third value being called called ID(8A+8B);

delivering the diluent gas from the diluent gas port (2) through the diluent gas pressure regulator (5) to only a second fixed flow fluid component (8C) of said plurality of fixed flow fluid components (8B-8F) to establish a fourth diluent gas flow called combined flow FD(8C) at the common outlet of the gas flow dilutor, and, using the flow meter (11) connected to the common output, reading a fourth value of a diluent gas flow indication corresponding to said flow FD(8C), the fourth value being called called ID(8C);

making a second approximation $$FD(\mathbf{8}C) = FD(\mathbf{8}A+\mathbf{8}B) * ID(\mathbf{8}C)/ID(\mathbf{8}A+\mathbf{8}B);$$

delivering the diluent gas from the diluent gas port (2) through the diluent gas pressure regulator (5) to only the calibrating fluid fixed flow fluid component (8A), and to the first and second fixed flow fluid components (8B, 8C) of said plurality of fixed flow fluid components (8B-8F), to establish a fifth diluent gas flow called combined flow FD(8A+8B+8C) at the common outlet of the gas flow dilutor, and, using the flow meter (11) connected to the common output, reading a fifth value of a diluent gas flow indication corresponding to said combined flow FD(8A+8B+8C), the fifth value being called called ID(8A+8B+8C);

delivering the diluent gas from the diluent gas port (2) through the diluent gas pressure regulator (5) to only a third fixed flow fluid component (8D) of said plurality of fixed flow fluid components (8B-8F) to establish a sixth diluent gas flow called combined flow FD(8D) at the common outlet of the gas flow dilutor, and, using the flow meter (11) connected to the common output, reading a sixth value of a diluent gas flow indication corresponding to said flow FD(8D), the sixth value being called called ID(8D);

making a third approximation $$FD(\mathbf{8}D) = FD(\mathbf{8}A+\mathbf{8}B+\mathbf{8}C) * ID(\mathbf{8}D)/ID(\mathbf{8}A+\mathbf{8}B+\mathbf{8}C);$$

delivering the diluent gas from the diluent gas port (2) through the diluent gas pressure regulator (5) to only the calibrating fluid fixed flow fluid component (8A), and to the first, second, and third fixed flow fluid components (8B, 8C, 8D) of said plurality of fixed flow fluid components (8B-8F), to establish a seventh diluent gas flow called combined flow FD(8A+8B+8C+8D) at the common outlet of the gas flow dilutor, and, using the flow meter (11) connected to the common output, reading a seventh value of a diluent gas flow indication corresponding to said combined flow FD(8A+8B+8C+8D), the seventh value being called called ID(8A+8B+8C+8D);

delivering the diluent gas from the diluent gas port (2) through the diluent gas pressure regulator (5) to only a fourth fixed flow fluid component (8E) of said plurality of fixed flow fluid components (8B-8F) to establish an eighth diluent gas flow called combined flow FD(8E) at the common outlet of the gas flow dilutor, and, using the flow meter (11) connected to the common output, reading a eighth value of a diluent gas flow indication corresponding to said flow FD(8E), the eighth value being called called ID(8E);

making a fourth approximation $$FD(\mathbf{8}E) = FD(\mathbf{8}A+\mathbf{8}B+\mathbf{8}C+\mathbf{8}D) * ID(\mathbf{8}E)/ID(\mathbf{8}A+\mathbf{8}B+\mathbf{8}C+\mathbf{8}D);$$

delivering the diluent gas from the diluent gas port (2) through the diluent gas pressure regulator (5) to only the calibrating fluid fixed flow fluid component (8A), and to the first, second, third, and fourth fixed flow fluid components (8B, 8C, 8D, 8E) of said plurality of fixed flow fluid components (8B-8F), to establish a ninth diluent gas flow called combined flow FD(8A+8B+8C+8D+8E) at the common outlet of the gas flow dilutor, and, using the flow meter (11) connected to the common output, reading a ninth value of a diluent gas flow indication corresponding to said combined flow FD(8A+8B+8C+8D+8E), the ninth value being called called ID(8A+8B+8C+8D+8E);

delivering the diluent gas from the diluent gas port (2) through the diluent gas pressure regulator (5) to only a fifth fixed flow fluid component (8F) of said plurality of fixed flow fluid components (8B-8F) to establish a tenth gas flow called combined flow FD(8F) at the common outlet of the gas flow dilutor, and, using the flow meter (11) connected to the common output, reading a tenth value of a diluent gas flow indication corresponding to said flow FD(8F), the tenth value being called called ID(8F);

making a fifth approximation $$FD(\mathbf{8}F) = FD(\mathbf{8}A+\mathbf{8}B+\mathbf{8}C+\mathbf{8}D+\mathbf{8}E) * ID(\mathbf{8}F)/ID(\mathbf{8}A+\mathbf{8}B+\mathbf{8}C+\mathbf{8}D+\mathbf{8}E);$$

from the first through fifth approximations, determining respective relative flows of the first, second, third, fourth and fifth flow fluid components (8B, 8C, 8D, 8E, 8F) of said plurality of fixed fluid components (8B-8F) when supplied with the diluent gas through the second gas pressure regulator (5) and with respect to the calibrating fixed flow fluid component (8A) also supplied with the diluent gas through the second gas pressure regulator (5);

delivering the diluent gas from the second gas port (2) through the first gas pressure regulator (4) to the calibrating fixed flow fluid component (8A) so that the gas is delivered only to the calibrating fluid fixed flow fluid component (8A) and not to any of the plurality of fixed flow fluid components (8B-8F) thereby to establish a first gas flow called flow FS8A through the common output of the gas flow dilutor;

with the common output of the gas flow dilutor connected to a flow meter (11), reading a first value of a gas flow indication corresponding to said flow FS8A, the first value being called IS8A and being a reference flow value to which all other gas flows will be compared;

delivering the diluent gas from second gas port (2) through the first gas pressure regulator (4) to only the first fixed flow fluid component (8B) of said plurality of fixed flow fluid components to thereby establish a second gas flow called flow FS8B through the common outlet of the gas flow dilutor, and, using the flow meter (11) connected to the common output, reading a second value of a gas flow indication corresponding to the flow FS8B, the second value being called IS8B;

making a sixth approximation $$FS8B = FS8A * (IS8B/IS8A);$$

delivering the diluent gas from second gas port (2) through the first gas pressure regulator (4) to only the calibrating fluid fixed flow fluid component (8A) and to the first fixed flow fluid component (8B) of said plurality of fixed flow fluid components (8B-8F) to establish a third gas flow called combined flow FS(8A+8B) at the common outlet of the gas flow dilutor, and, using the flow meter (11) connected to the common output, reading a third value of a gas flow indication corresponding to said combined flow FS(8A+8B), the third value being called IS(8A+8B);

delivering the diluent gas from second gas port (2) through the first gas pressure regulator (4) to only the second fixed flow fluid component (8C) of said plurality of fixed flow fluid components (8B-8F) to establish a fourth gas flow called combined flow FS(8C) at the common outlet of the gas flow dilutor, and, using the flow meter (11) connected to the common output, reading a fourth value of a gas flow indication corresponding to said flow FS(8C), the fourth value being called IS(8C);

making a seventh approximation $$FS(8C) = FS(8A+8B) * IS(8C)/IS(8A+8B);$$

delivering the diluent gas from second gas port (2) through the first gas pressure regulator (4) to only the calibrating fluid fixed flow fluid component (8A), and to the first and second fixed flow fluid components (8B, 8C) of said plurality of fixed flow fluid components (8B-8F), to establish a fifth gas flow called combined flow FS(8A+8B+8C) at the common outlet of the gas flow dilutor, and, using the flow meter (11) connected to the common output, reading a fifth value of a gas flow indication corresponding to said combined flow FS(8A+8B+8C), the fifth value being called called IS(8A+8B+8C);

delivering the diluent gas from second gas port (2) through the first gas pressure regulator (4) to only the third fixed flow fluid component (8D) of said plurality of fixed flow fluid components (8B-8F) to establish a sixth gas flow called combined flow FS(8D) at the common outlet of the gas flow dilutor, and, using the flow meter (11) connected to the common output, reading a sixth value of a gas flow indication corresponding to said flow FS(8D), the sixth value being called called IS(8D);

making a eighth approximation $$FS(8D) = FS(8A+8B+8C) * IS(8D)/IS(8A+8B+8C);$$

delivering the diluent gas from second gas port (2) through the first gas pressure regulator (4) to only the calibrating fluid fixed flow fluid component (8A), and to the first, second, and third fixed flow fluid components (8B, 8C, 8D) of said plurality of fixed flow fluid components (8B-8F), to establish a seventh gas flow called combined flow FS(8A+8B+8C+8D) at the common outlet of the gas flow dilutor, and, using the flow meter (11) connected to the common output, reading a seventh value of a gas flow indication corresponding to said combined flow FS(8A+8B+8C+8D), the seventh value being called called IS(8A+8B+8C+8D);

delivering the diluent gas from second gas port (2) through the first gas pressure regulator (4) to only the fourth fixed flow fluid component (8E) of said plurality of fixed flow fluid components (8B-8F) to establish an eighth gas flow called combined flow FS(8E) at the common outlet of the gas flow dilutor, and, using the flow meter (11) connected to the common output, reading a eighth value of a gas flow indication corresponding to said flow FS(8E), the eighth value being called called IS(8E);

making a ninth approximation $$FS(8E) = FS(8A+8B+8C+8D) * IS(8E)/IS(8A+8B+8C+8D);$$

delivering the diluent gas from second gas port (2) through the first gas pressure regulator (4) to only the calibrating fluid fixed flow fluid component (8A), and to the first, second, third, and fourth fixed flow fluid components (8B, 8C, 8D, 8E) of said plurality of fixed flow fluid components (8B-8F), to establish a ninth gas flow called combined flow FS(8A+8B+8C+8D+8E) at the common outlet of the gas flow dilutor, and, using the flow meter (11) connected to the common output, reading a ninth value of a gas flow indication corresponding to said combined flow FS(8A+8B+8C+8D+8E), the ninth value being called called IS(8A+8B+8C+8D+8E);

delivering the diluent gas from second gas port (2) through the first gas pressure regulator (4) to only the fifth fixed flow fluid component (8F) of said plurality of fixed flow fluid components (8B-8F) to establish a tenth gas flow called combined flow FS(8F) at the common outlet of the gas flow dilutor, and, using the flow meter (11) connected to the common output, reading a tenth value of a gas flow indication corresponding to said flow FS(8F), the tenth value being called called IS(8F);

making a tenth approximation $$FS(8F) = FS(8A+8B+8C+8D+8E) * IS(8F)/IS(8A+8B+8C+8D+8E);$$

from the sixth through tenth approximations, determining respective relative flows of the first, second, third, fourth, and fifth fixed flow fluid components (8B, 8C, 8D, 8E, 8F) of said plurality of fixed flow fluid components (8B-8F) when supplied with the diluent gas through the first gas pressure regulator (4) and with respect to the calibrating fixed flow fluid component (8A) also supplied with the diluent gas through the first gas pressure regulator (4);

using the flow meter (11) connected to the common output, comparing the gas flow through the calibrating fixed flow fluid component (8A) when supplied with gas from the first gas port (1) through the first pressure regulator (4) to the gas flow obtained when supplied with diluent gas through the second gas pressure regulator (5) to obtain a relationship FS8A=FD8A\*(IS8A/ID8A); and calculating respective relative flows of the diluent gas and the gas through each of the first, second, third, fourth, and fifth fixed flow fluid components (8B, 8C, 8D, 8E) of said plurality of fixed flow fluid components (8B-8F).

2. A method according to claim 1, wherein at least one of said fixed flow fluid components is coupled to provide the diluent gas in said gas flow dilutor and at least one other of said fixed flow fluid components is coupled to provide the gas to be diluted.

3. A method according to claim 1, wherein said fixed flow fluid components are provided with orifices.

4. A method according to claim 1, wherein said fixed flow fluid components are provided with capillaries.

5. A method according to claim 1, wherein the calibrating fluid fixed flow fluid component (8A), and the first, second, third, fourth, and fifth fixed flow fluid components (8B, 8C, 8D, 8E, 8F) of said plurality of fixed flow fluid components (8B-8F), have respective capacities of 1, 1, 2, 4, 8, and 16 units of flow respectively.

6. A method according to claim 1, wherein the calibrating fluid fixed flow fluid component (8A), and the first, second, third, fourth, and fifth fixed flow fluid components (8B, 8C, 8D, 8E, 8F) of said plurality of fixed flow fluid components (8B-8F), have respective capacities of at least 1, 1, and 2 units of flow respectively.

7. A method according to claim 1, including the step of providing calibration to compensate for long-term drift by means of said flow meter.

8. A method according to claim 1, including the step of providing the gas flow through the first gas pressure regulator (4) and the same time as providing the diluent gas through the second gas pressure regulator (5), wherein a respective capacity of the first and second gas pressure regulators (4, 5) is equal.

9. A method according to claim 1, comprising the further step of operating the first tap (7A) and the further taps (7B, . . . 7F) to selectively provide the gas and the diluent gas at the common outlet of the gas flow dilutor in desired relative concentrations.

10. A method according to claim 1, wherein the first tap (7A) and the further taps (7B, . . . 7F) are operated to simultaneously shut off the flow of both the gas and the diluent gas to the common outlet of the gas flow dilutor.

11. A method according to claim 1, wherein the calibrating fluid fixed flow fluid component (8A), and the first, second, third, fourth, and fifth fixed flow fluid components (8B, 8C, 8D, 8E, 8F) of said plurality of fixed flow fluid components (8B-8F), have respective capacities of 1, 1, 1, 3, 5, and 10 units of flow respectively.

12. A method according to claim 6, comprising the further the step of measuring a differential pressure between said first and second gas pressure regulators (4, 5) and compensating for the differential pressure between said first and second gas pressure regulators (4, 5).

\* \* \* \* \*